United States Patent [19]
Hoedl

[11] Patent Number: 5,540,536
[45] Date of Patent: Jul. 30, 1996

[54] REUSABLE PACKAGING, SHIPPING AND DISPLAY SYSTEM

[75] Inventor: Herbert K. Hoedl, Newmarket, Canada

[73] Assignee: Ecopal Canada Inc., Stoney Creek, Canada

[21] Appl. No.: 194,437

[22] Filed: Feb. 10, 1994

[51] Int. Cl.⁶ .................................................. B65D 83/00
[52] U.S. Cl. .......................... 414/417; 206/507; 220/625; 414/786
[58] Field of Search .................................. 414/417, 786, 414/403; 220/4.34, 625; 206/815, 507

[56] References Cited

U.S. PATENT DOCUMENTS

| | | | |
|---|---|---|---|
| 2,921,702 | 1/1960 | Grass | 414/417 |
| 3,185,339 | 5/1965 | Fleming | 220/625 X |
| 4,440,321 | 4/1984 | Campbell et al. | 206/815 X |
| 4,789,075 | 12/1988 | Sun | 220/4.34 |

OTHER PUBLICATIONS

Menasha Corporation, "Lewisystems: Prodduct Reference Guide", 1992, Watertown, WI, USA.
Buckhorn, A Myers Industries Company, "Buckhorn Shipping, Storage & Handling Containers", 1993, Milford, Ohio, USA.

*Primary Examiner*—Karen B. Merritt
*Assistant Examiner*—Janice L. Krizek
*Attorney, Agent, or Firm*—Jeffrey T. Imai; D. Doak Horne; Arne I. Fors

[57] ABSTRACT

A reusable and returnable container system for packaging, shipping and displaying goods comprises a tote having an opening in a bottom surface and an upper opening. The opening in the bottom surface has an abutment for supporting a tray inside the tote. The tote is preferably stackable and nestable with like totes. The tray is adapted to carry goods and is insertable into the tote for resting on the abutment. The tote is easily separated from the tray without first removing the goods. Each tray can be transferred to a shelf for displaying the goods for selection by consumers. After the tray has been emptied, each tray can be stored in a stack of nested totes for returning for re-use.

14 Claims, 7 Drawing Sheets

REUSABLE PACKAGING, SHIPPING AND DISPLAY SYSTEM

FIELD OF THE INVENTION

This invention relates to a reusable tote or container and system for packaging and shipping goods and produce to a retailer for retailing and returning the containers for re-use. In particular, this invention relates to reusable shipping boxes or containers for packaging and shipping goods from the manufacturer or packager to the retail outlets and a system for unpacking goods packed within the shipping containers for easy and convenient point of sale retailing and for returning the shipping containers for re-use.

BACKGROUND OF INVENTION

In the retailing industry, goods are individually packaged and then a number of individual packages are packed into cardboard boxes for shipping to point of sale retailers, such as a grocery store or supermarket.

At the point of sale, the boxes usually are manually cut with a knife about an inch above the bottom at its vertical walls and the top portion of the remaining box is lifted off to freely expose the goods stored inside the box. The remaining bottom portion of the box is then used as a display tray to support the goods to be lifted and put on the display shelves in the grocery store enabling the customer a clear view of the goods to select the product of choice.

Alternatively, the goods are removed from the boxes and manually placed and arranged or stacked on the shelf. Once all the goods are removed, the trays or boxes are usually baled together for recycling or disposal.

These boxes are usually made from corrugated cardboard which provide protection of the packaged goods and for the easy handling of the plurality of goods packaged inside.

The existing one way shipping system is rather costly not only because of its single use but because it is labor intensive. Corrugated boxes and the remaining trays are not very strong and permit damage to the goods during transit. It is not uncommon for boxes or trays to collapse, be damaged by the forks of forklift trucks, by humidity and by nails penetrating from the pallets. Frequently the goods themselves are also damaged by the operator when cutting off the upper portion of the box. Further, operators can cut themselves when cutting the box, resulting in additional costs.

As the bottom portion of these boxes are used for "display" purposes, such damaged display trays frequently end up on the retail shelves, resulting in visually unattractive displays for customers.

Totes or containers are well known in the art and are commercially available. Plastic totes are widely used in the moving industry. Plastic heavy duty totes can have a hinged lid which interlock upon closing. In a closed condition, the totes store goods and stack for transport. In an open condition, the totes nest for occupying a reduced space for return transport. In other models of totes, the totes have open tops but are fitted with a series of tabs or bars which allow the totes to stack in one position and nest in another or opposite position. Other models have removable lids for stacking and nesting and which are stackable themselves. Still other models are designed only for stacking and do not nest.

Although totes provide good protection for the goods during transport, the totes of the prior art must be unpacked by individually removing each packaged product. Alternatively, trays could be used on which the goods are stored. However, there is no easy way to access the tray through the top of the tote. If a tote is fully packed, the operator's hands must squeeze between the sides of the tote and the packaged goods. If the tray is made smaller to provide access, the efficiency of the system diminishes to a point where the system becomes uneconomical.

SUMMARY OF THE INVENTION

The disadvantages of the prior art may be overcome by providing a tote having an open bottom defining an abutment and covering the opening with a tray for resting on the abutment. The tray is adapted to receive goods and be placed in the tote for packaging and transport. A pedestal has a size for slidably receiving the tote through the open bottom and projecting the tray out of the tote. The tote is placed over the pedestal and moved relative thereto urging the tray out of the tote for transferring to a point of sale.

It is desirable to provide a returnable packaging, shipping and display system which can be used for goods that are packaged, stored, shipped and displayed in the retail industry.

It is desirable to provide a tote with a projected combined footprint identical to the dimension of standard pallets.

It is still further desirable to provide totes in different heights to accommodate different heights of the goods sold in the retail industry and/or to accommodate more than one layer of goods stacked in the tote one on top of the other.

According to one aspect of the invention, there is provided a returnable packaging, shipping and display system comprising an outer tote and at least one separate goods carrying tray nested inside at the bottom of the tote, which is easily removed from the tote at the point of sales to be used as a display tray at the point of sales. A pedestal is used to remove the trays out of the tote. The system is preferably made from thermoplastic material in order to provide for its multiple use and for its recycling after its useful life. The system can be adapted to use a plurality of trays stacked inside the tote in addition to the tote being produced in various sizes.

According to another aspect of the invention, there is provided a reusable and returnable tote for packaging, shipping and displaying goods. The tote comprises an opening in a bottom surface, an upper opening and a tray. The opening in the bottom surface has an abutment for supporting the tray inside the tote. The tote is preferably stackable and nestable with like totes. The tray is removable from the tote by placing the tote over a pedestal and sliding the tote relative thereto urging the tray out of the tote.

According to another aspect of the invention, there is provided a reusable and returnable container system for packaging, shipping and displaying goods. The system comprises a tote having an opening in a bottom surface and an upper opening. The opening in the bottom surface has an abutment for supporting a tray inside the tote. The tote is preferably stackable and nestable with like totes. The tray is adapted to carry goods and is insertable into the tote for resting on the abutment. A pedestal has a planar top surface sized to extend through the opening in the bottom surface of the tote and to support the tray. A tote containing a tray carrying goods is placed over the pedestal and slid relative thereto urging the tray out of the tote to rest upon the top surface of the pedestal.

According to yet another aspect of the invention, there is provided a method of recirculating reusable containers. The method comprises the steps of:

depositing goods onto a tray resting on an abutment of a tote, the tote comprising an opening in a bottom surface, an upper opening and a tray, the opening in the bottom surface having the abutment for supporting the tray inside the tote;

stacking a plurality of totes onto a pallet for transporting the plurality of totes to a point of sale;

unloading each tote of the plurality of totes by placing each tote over a pedestal and sliding each tote relative thereto urging the tray out of the tote, the pedestal sized to extend through the opening in the bottom surface of the tote and to support the tray;

nesting the plurality of totes, when in an unloaded condition, into a stack;

transferring each tray of the plurality of totes to a shelf for displaying the goods for selection by consumers;

loading each emptied tray of the plurality of totes into an uppermost tote of the stack; and returning the stack and trays for re-use.

According to yet another aspect of the invention, a reusable and returnable tote for packaging, shipping and displaying goods is provided. The tote comprises an open bottom, an upper opening, a releasable tray and a plurality of locking pins slidably engaging the tote at a base area thereof. The locking pins are slidable between a locked position to extend into the open bottom for supporting said tray inside said tote and an unlocked position to fully open the open bottom releasing the tray. The tote is removable from the tray by sliding the locking pins to the unlocked position and sliding the tote relative thereto.

DESCRIPTION OF THE DRAWINGS

In drawings which illustrate the preferred embodiment of the invention.

DETAILED DESCRIPTION OF THE INVENTION

Figure 1:
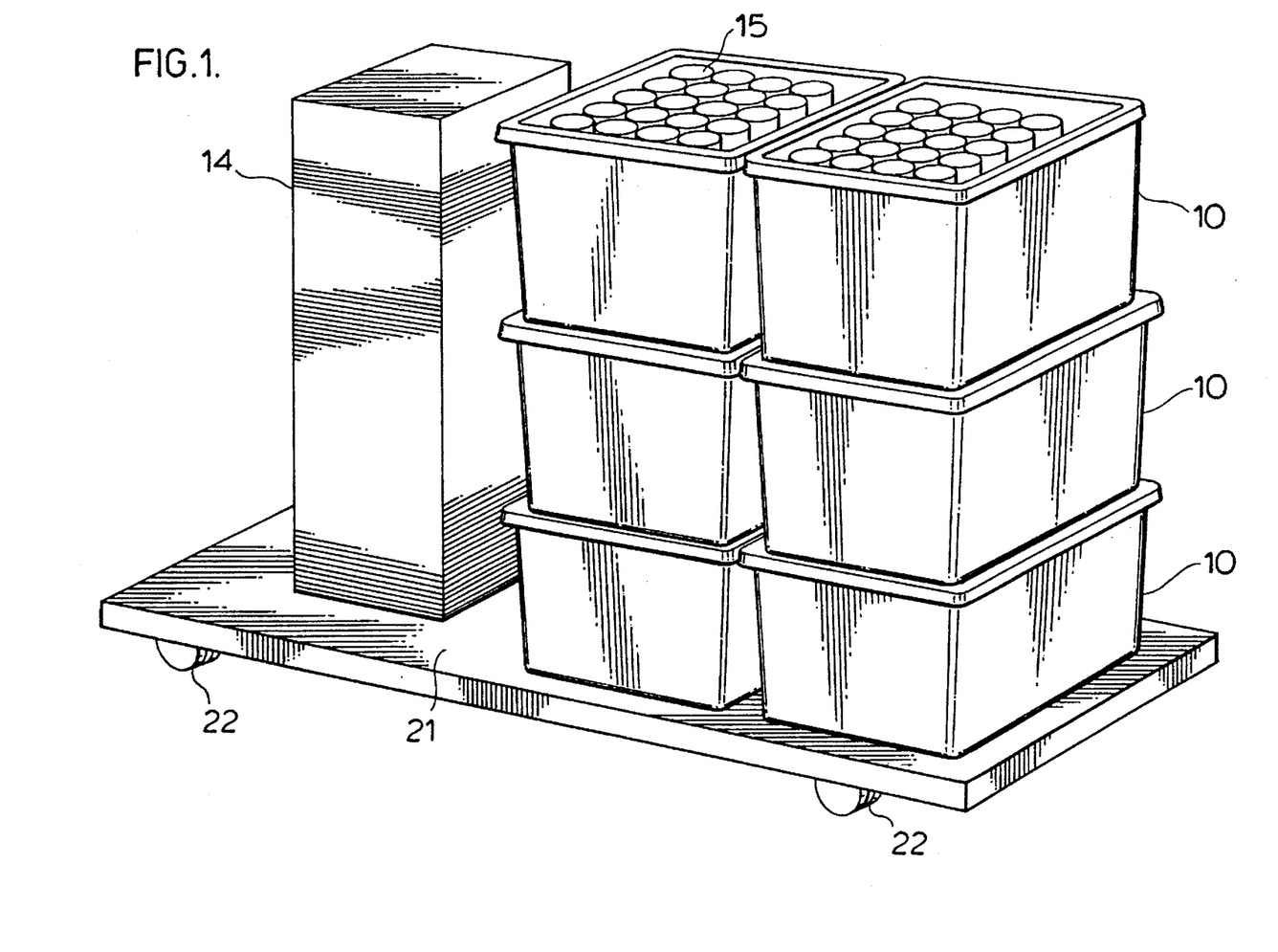
FIG. 1 is a perspective view of the present invention.
Figure 2:
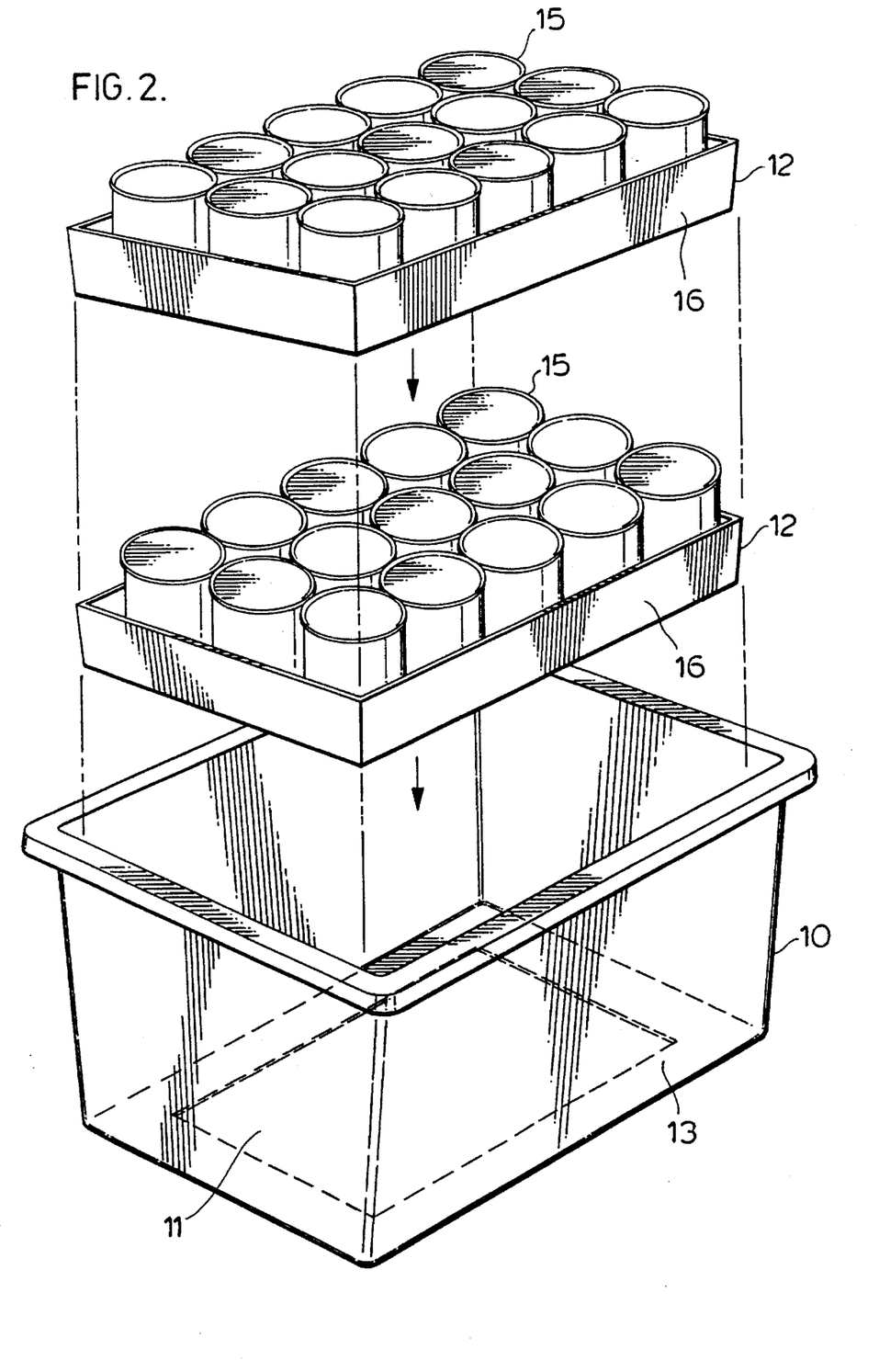
FIG. 2 is an exploded perspective view of the tote and tray of the invention of FIG. 1.

The present invention is illustrated in FIGS. 1 and 2. The system comprises a plastic tote 10, at least one separate tray 12 supporting the goods 15 to be packaged, stored, shipped and displayed and a pedestal 14.

Tote 10 has tapered walls and an opening or aperture 11 in the bottom surface. Aperture 11 is slightly smaller than the bottom of the tote 10, defining a horizontal ridge or flange 13 at its bottom. Flange 13 acts as an abutment surface for supporting the tray 12 and keeps it firmly in place when the tote is lifted.

Tray 12 has a size to fit at the bottom of the tote 10. The bottom periphery of tray 12 is sized close to the dimensions of the inner bottom periphery dimensions of the tote 10. The tray 12 has tapered side walls which allow the trays to be nestable. Optionally, the outer surface 16 of the tray 12 can carry advertising, pricing information and other eye catching or marketing information.

Other shapes of trays are also contemplated within the scope of this invention. The tray 12 could have straight walls so that the trays only stack. Tray 12 could also be contoured for an aesthetic appearance.

Figure 3:
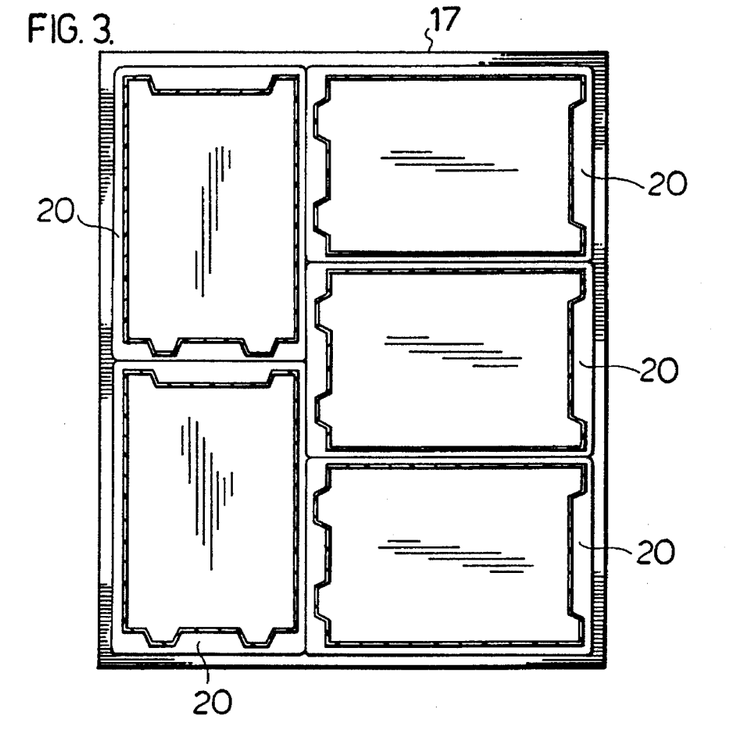
FIG. 3 is a top plan view of the totes of the invention of FIG. 1 in a standard 5-stack.

Referring to FIG. 3, pallets 17 used in the retail industry in North America have a standardized dimension of 48×40 inches. The totes will preferably have a projected combined footprint identical to the dimension of such pallets. As a typical example, with four totes/layer each tote would have a projected footprint of 24×20 inches or with six totes/layer each tote would have a projected footprint of 16×20 inches. FIG. 3, illustrates a standard five totes/layer.

Figure 4:
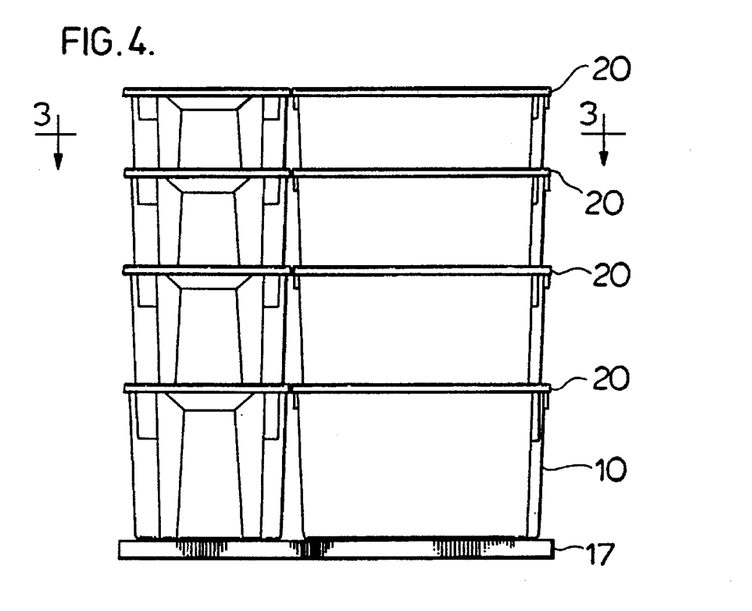
FIG. 4 is a side elevational view of the invention of FIG. 1, illustrating totes having different heights.

Referring to FIG. 4, totes 10 can be manufactured in different heights to accommodate the different heights of the goods sold in the retail industry. Additionally, the height can be used to accommodate more than one tray nested in the tote and stacked on top of each other.

Figure 5:
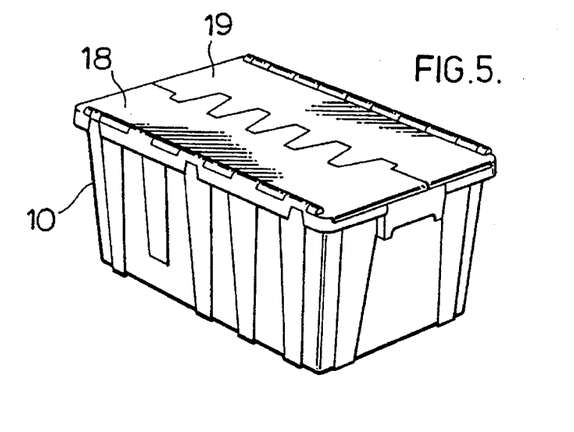
FIG. 5 is a perspective view of a tote of the invention of FIG. 1 having a hinged lid.

In one embodiment illustrated in FIG. 5, totes 10 have a pair of hinged cover plates 18 and 19 which are hingedly joined to the tote along the upper longitudinal edges of the tote. In a closed condition, like totes can be stacked. In an open condition with the hinged cover plates pivoted outwardly, like totes nest within each other.

Figure 6:
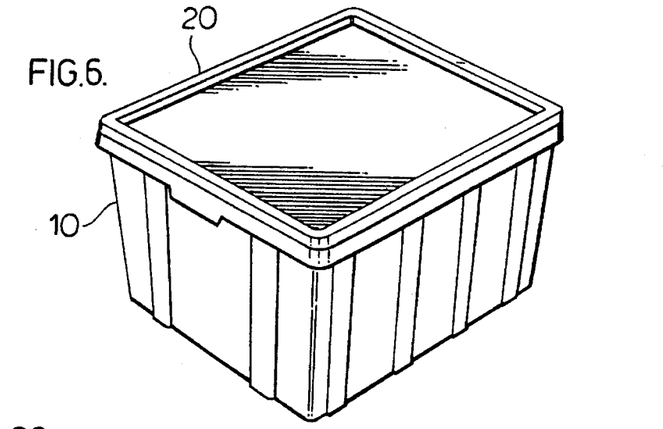
FIG. 6 is a perspective view of a tote of the invention of FIG. 1 having a stackable lid.

There are numerous other stacking and nesting means for adapting a tote to be nestable and stackable. As illustrated in FIG. 6, a tote may simply have tapered sides and a lid 20 which is itself stackable with like lids. Alternatively the simplest tote, which could be used in the present invention, has vertical sides for stacking like totes but do not nest.

Figure 7:
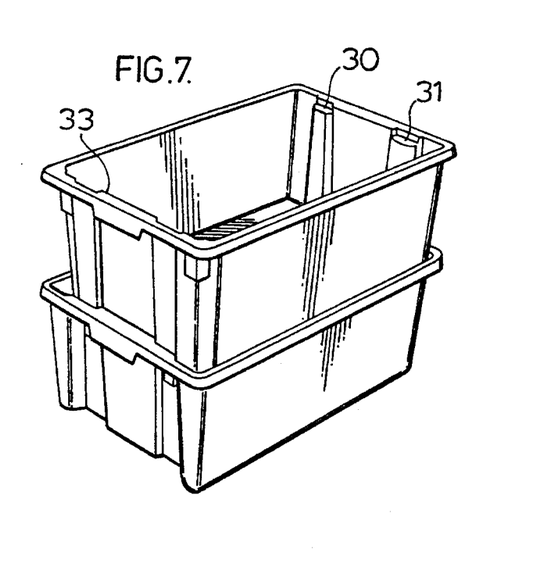
FIG. 7 is a perspective view of a tote of the invention of FIG. 1 having tabs for stacking like totes.
Figure 8:
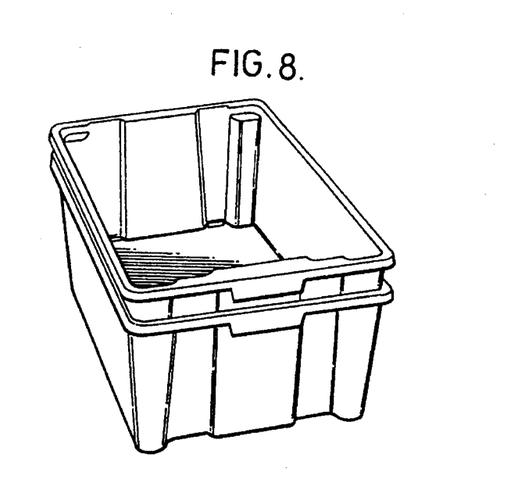
FIG. 8 is a perspective view of a tote of the invention of FIG. 7 illustrating like totes in a nesting condition.

As illustrated in FIGS. 7 and 8, a tote may have a series of tabs 30, 31 and 33 on the upper inner edge of the tote. By placing the tabs in an alternating arrangement, the tote will nest when the totes are aligned and will stack when in an alternating pattern.

Alternatively, a pivoting bar can be hingedly mounted onto the upper edge. The bar pivots to extend across the top of the totes presenting a support means for stacking like totes. The bars pivot to rest along the side of the totes allowing like totes to nest.

In use, goods 15 are placed onto trays 12. Trays 12 are then placed within the tote 10 and suitably closed. Alternatively, automated packaging machines could be modified to automatically load goods 15 onto tray 12 while the tray is already inserted into the tote. The loaded totes are then stacked onto pallets for shipping. A number of totes are stacked in a manner well known in the art. The loaded pallets are transported to the retailer.

Figure 9:
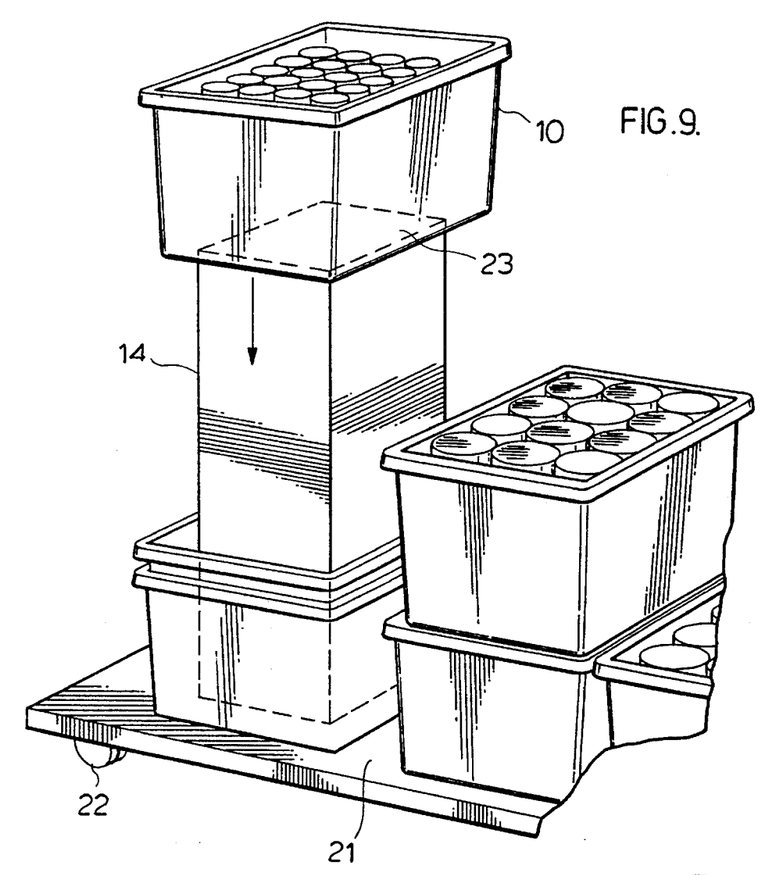
FIG. 9 is a partial perspective view of the invention of FIG. 1 illustrating the totes being unloaded.

An operator loads the totes onto pedestal 14 which has a lower platform 21 for carrying loaded totes in a stacked condition. The platform has a set of rolling wheels 22 for transferring the loaded totes to an area of shelves where the goods are to be displayed.

Figure 10:
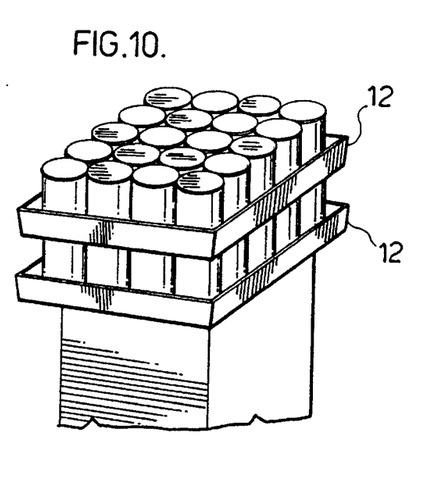
FIG. 10 is a perspective view of the invention of FIG. 1 with the trays in an unloaded condition.
Figure 11:
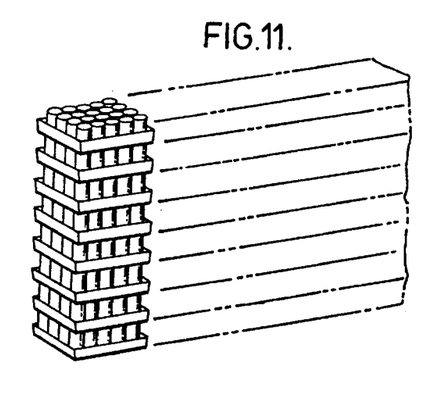
FIG. 11 is a perspective view of the invention of FIG. 1 with the trays stacked on a shelf at the point of purchase.

The loaded tote 10 with the tray 12 with the goods 15 are unpacked simply by lifting the tote 10 and aligning the tote 10 with the tray 12 positioned inside the tote 10, on top of a pedestal 14. The top surface 23 has a footprint identical to or slightly smaller than the aperture 11 in the bottom of the tote 10. Top surface 23 is complementary to the bottom tray 12. Pedestal 14 will engage with the bottom of the tray 12, allowing tote 10 to slide downwards and leaving the tray 12 on top of the pedestal, as illustrated in FIG. 10. The tray 12 with the goods 15 is then put on the shelves as illustrated in FIG. 11.

The operation is repeated unloading other loaded totes. As subsequent totes are unloaded, the totes will become nested about the pedestal. Once a number of totes have been unloaded, the stack of totes can be lifted and removed from the pedestal. The stack can be returned to the lower platform for return to the storage area of the store.

After removal of the goods 15 from the tray 12, the trays 12 can be stacked and loaded into an uppermost tote 10 in a return stack. The stacks of totes, together with the trays, can be shipped back to its origin for cleaning and re-use.

It is apparent that tote 10 may contain more than one tray 12 nested on top of each other in the tote 10. One tray 12, nested at the bottom of the tote 10 could have two trays each half the size of tray 12 next to each other stacked on top of the first tray 12.

Further, the totes 10 can be standardized to a set of dimensions or a series of sizes. If a new product is to be packed within the tote system of the present invention which is not of a conventional size, only the tray needs to be modified or re-designed rather than modifying the entire tote.

Figure 12:
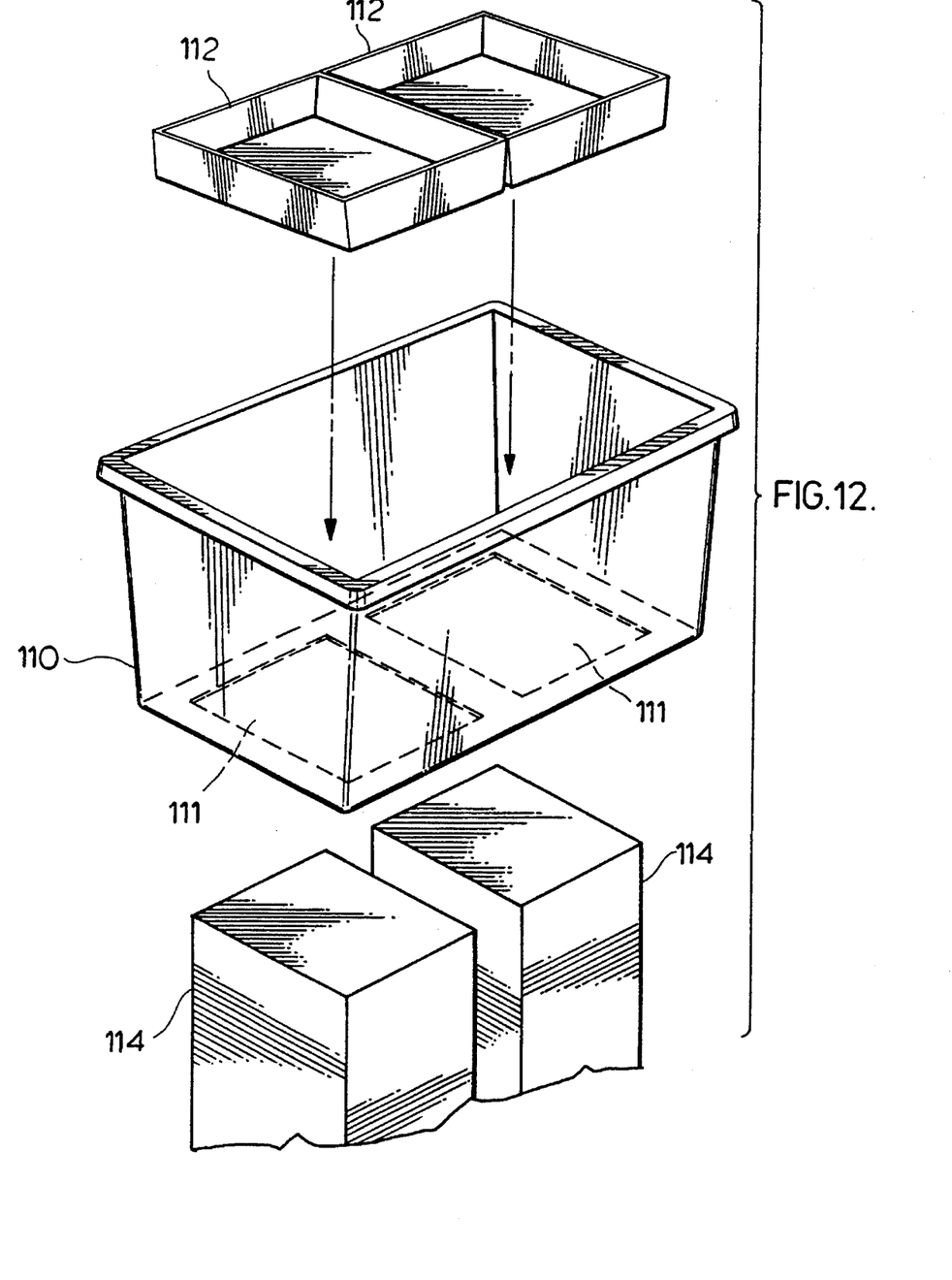
FIG. 12 is a perspective view of a second embodiment of the present invention having more than one tray.

In a second embodiment illustrated in FIG. 12, tote 110 has multiple apertures 111 whereby more than one tray 112 could be nested in the tote next to each other. The corresponding pedestals 114 are matched to project trays 112 out of the tote.

Figure 13:
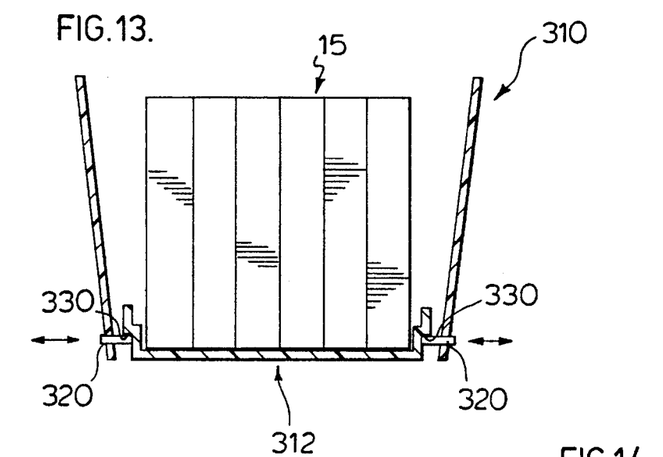
FIG. 13 is a side sectional view of a third embodiment of the present invention with the tray in a locked condition.
Figure 14:
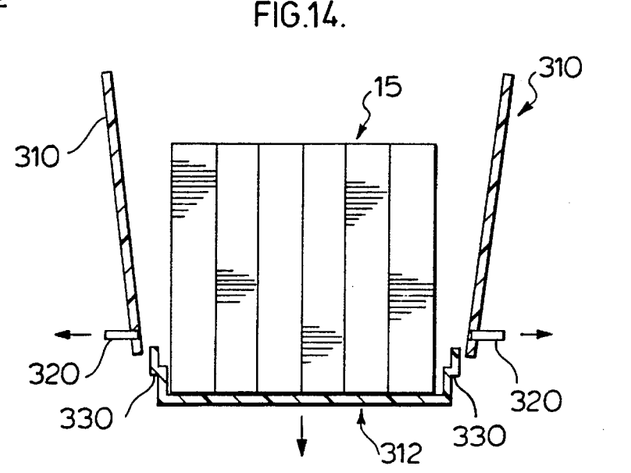
FIG. 14 is a side sectional view of the embodiment of FIG. 13 with the tray in an unlocked condition.

In a third embodiment of the present invention as illustrated in FIGS. 13 and 14, tote 310 has an open bottom. Locking pins 320 extend through apertures in the base of the side walls of tote 310. Locking pins 320 are movable between a locked position to extend into the base area of the tote and an unlocked position to fully open the open bottom of the tote 310, as indicated by the arrows.

The engagement between the locking pins 320 and the tote 310 can be of any known form including a friction fit, a screw fit or a wedge fit. The outer head of the locking pins can be adapted to lie flush with the side wall of the tote 310 so as to not interfere with the nesting of like totes. In any event, locking pins 320 preferably are retained to the tote 310.

Tray 312 has an abutment surface 330 for engaging the locking pins. Tray 312 holds goods 15 for shipping and is sized to pass through the open bottom of tote 310. The abutment surface 330 of tray 312 is spaced above the base of the side walls of tote 310 such that both the bottom of the tray 312 and the base of the side walls of tote 310 are substantially co-planar.

In use, locking pins 320 are fully engaged in the locked position. Tray 312 is placed on top of the locking pins 320. Tote 310 is loaded with goods 15 and shipped to the point of purchase. The operator merely pulls the locking pins 320 to the unlocked position releasing the tray 312. The operator can now remove the wall section of tote 310 exposing tray 312 and goods 15 for transfer to a shelf.

Figure 15:
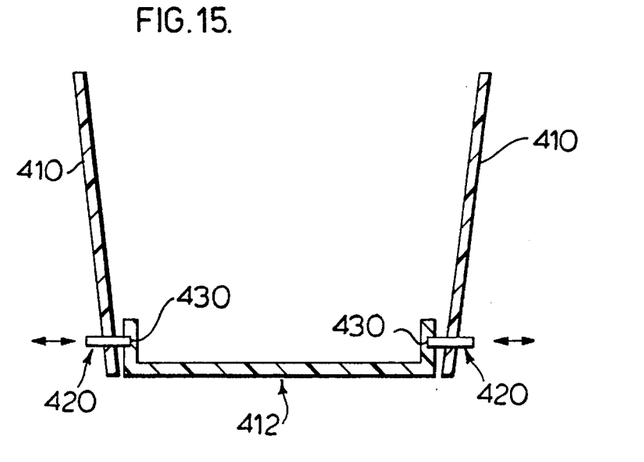
FIG. 15 is a side sectional view of a fourth embodiment of the present invention.

In a fourth embodiment of the invention as illustrated in FIG. 15, tote 410 has an open bottom. Tray 412 is sized to pass through the open bottom of tote 410. The side of tray 412 has a groove or recess 430 for receiving locking pins 420. Groove 430 restricts movement of the tray 412 upwardly and downwardly.

The tote 4 10 operates in a similar fashion as the totes of FIGS. 13 and 14.

While the invention herein has been described in connection with exemplary embodiments, it will be understood that many modifications will be apparent to those skilled in the art.

I claim:

1. A reusable and returnable container system for packaging, shipping and displaying goods, said system comprising:

a tote having integral side walls presenting an open bottom and an upper opening, said integral side walls having abutment means for supporting a tray inside said tote;

said tray adapted to carry goods, said tray insertable into said tote for resting on said abutment means and substantially closing said open bottom;

a pedestal to extend through said open bottom of said tote and to support said tray;

whereby a tote containing a tray carrying goods is placeable over said pedestal and slidable relative thereto urging said tray out of the tote to rest upon said pedestal.

2. The system as claimed in claim 3 wherein said abutment means extends across said open bottom presenting a plurality of apertures and said system further comprises a plurality of said pedestals, each of said pedestals matched with a corresponding one of said apertures to project said tray out of said tote.

3. The system as claimed in claim 1 wherein said tote has stacking and nesting means for adapting said tote to be stackable and nestable with like totes.

4. The system as claimed in claim 3 wherein said stacking and nesting means comprises said side walls being tapered outwardly for receiving a like tote in a nesting relation and a lid for covering said upper opening.

5. The system as claimed in claim 4 wherein said lid comprises a pair of hinged cover plates hingedly connected to said side walls on opposite sides thereof, said cover plates swingable between a closed condition to cover said upper opening and an open condition pivoted outwardly permitting like totes to nest.

6. The system as claimed in claim 3 wherein said stacking and nesting means comprises said side walls being tapered outwardly for receiving a like tote in a nesting relation and a series of tabs on said side walls whereby when said like totes are aligned said like totes nest and when said totes are alternated, said like totes stack.

7. A method of recirculating reusable containers, the method comprising the steps of:

depositing goods onto a tray, placing said tray on an abutment means of a tote, said tote comprising side walls presenting an open bottom and an upper opening, said side walls having said abutment means for supporting said tray inside said tote;

stacking a plurality of totes onto a pallet for transporting said plurality of totes to a point of sale;

unloading each tote of said plurality of totes by placing each tote over a pedestal and sliding each tote relative thereto urging said tray out of the tote, said pedestal having a size to extend through said open bottom of said tote and adapted to support said tray;

nesting said plurality of totes, when in an unloaded condition, into a stack;

transferring each tray of said plurality of totes to a shelf for displaying said goods for selection by consumers;

loading each tray of said plurality of totes into an uppermost tote of said stack;

returning said stack and trays for re-use.

8. The method as claimed in claim 7 wherein said tote has stacking and nesting means for adapting said tote to be stackable and nestable with like totes.

9. The method as claimed in claim 8 wherein said stacking and nesting means comprises said side walls being tapered outwardly for receiving a like tote in a nesting relation and a lid for covering said upper opening.

10. The method as claimed in claim 9 wherein said lid comprises a pair of hinged cover plates hingedly connected to said side walls on opposite sides thereof, said cover plates swingable between a closed condition to cover said upper opening and an open condition pivoted outwardly permitting like totes to nest.

11. The method as claimed in claim 8 wherein said stacking and nesting means comprises said side walls being tapered outwardly for receiving a like tote in a nesting relation and a series of tabs on said side walls whereby when like totes are aligned said like totes nest and when said like totes are alternated, said like totes stack.

12. A reusable and returnable tote for packaging, shipping and displaying goods, said tote comprising integral side walls presenting an open bottom, an upper opening, a releasable tray and a plurality of locking pins slidably engaging said tote at a base area thereof, said locking pins slidable between a locked position to extend into the open bottom for supporting said tray inside said tote and an unlocked position to fully open the open bottom by releasing said tray; said tote having stacking and nesting means for adapting said tote to be stackable and nestable With like totes, said stacking and nesting means comprises said side walls being tapered outwardly for receiving a like tote in a nesting relation and a series of tabs on said side walls whereby when like totes are aligned said like totes nest and when said like totes are alternated said like totes stack.

13. A reusable and returnable tote for packaging, shipping and displaying goods, said tote comprising integral side walls presenting an open bottom and an upper opening and a tray, said side walls having abutment means for supporting said tray inside said tote, said tray substantially closing said open bottom when engaging said abutment means, said tote having stacking and nesting means for adapting said tote to be stackable and nestable with like totes, said stacking and nesting means comprises said side walls being tapered outwardly for receiving a like tote in a nesting relation and a lid for covering said upper opening, said lid comprises a pair hinged cover plates hingedly connected to said side walls on opposite sides thereof, said cover plates swingable between a closed condition to cover said upper opening and an open condition pivoted outwardly permitting like totes to nest, whereby said tray is removable from said tote by placing said tote over a pedestal and sliding said tote when said cover plates are in the open condition relative to the pedestal urging said tray out of the tote.

14. A reusable and returnable tote for packaging, shipping, and displaying goods, said tote comprising integral side walls presenting an open bottom and an upper opening and a tray, said side walls having abutment means for supporting said tray inside said tote, said tray substantially closing said open bottom when engaging said abutment means, said tote having stacking and nesting means for adapting said tote to be stackable and nestable with like totes, said stacking and nesting means comprises said side walls being tapered outwardly for receiving a like tote in a nesting relation and a series of tabs on said side walls whereby when like totes are aligned said like totes nest and when said like totes are alternated, said like totes stack, whereby said tray is removable from said tote by placing said tote over a pedestal and sliding said tote relative thereto urging said tray out of the tote.

\* \* \* \* \*